(12) United States Patent
Kim (10) Patent No.: US 12,359,788 B2
(45) Date of Patent: Jul. 15, 2025

(54) LENS SHEET WITH DIFFERENT VIEWING ANGLES AND LAMP FOR VEHICLE

(71) Applicant: HYUNDAI MOBIS CO., LTD., Seoul (KR)

(72) Inventor: Seok Huyn Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/334,273

(22) Filed: Jun. 13, 2023

(65) Prior Publication Data

US 2024/0167657 A1    May 23, 2024

(30) Foreign Application Priority Data

Nov. 21, 2022   (KR) .................. 10-2022-0156634

(51) Int. Cl.
| | |
|---|---|
| *F21S 41/265* | (2018.01) |
| *F21S 41/143* | (2018.01) |
| *G02B 3/00* | (2006.01) |
| *G02B 30/29* | (2020.01) |

(52) U.S. Cl.
CPC .......... *F21S 41/265* (2018.01); *F21S 41/143* (2018.01); *G02B 3/005* (2013.01); *G02B 30/29* (2020.01)

(58) Field of Classification Search
CPC ...... F21S 41/143; F21S 41/265; G02B 3/005; G02B 3/0043; G02B 30/27; G02B 30/29
See application file for complete search history.

(56) References Cited

U.S. PATENT DOCUMENTS

| | | | | |
|---|---|---|---|---|
| 6,048,081 A | * | 4/2000 | Richardson | G02B 5/0278 362/268 |
| 6,624,934 B1 | * | 9/2003 | Moshrefzadeh | G03B 21/625 359/457 |
| 2008/0037947 A1 | * | 2/2008 | Chao | G02B 3/0043 385/146 |
| 2015/0062470 A1 | * | 3/2015 | Sumi | G02B 3/0043 359/463 |
| 2017/0144468 A1 | * | 5/2017 | Kaizuka | B42D 25/425 |
| 2019/0025472 A1 | * | 1/2019 | Cheng | G02B 3/0043 |
| 2019/0064537 A1 | * | 2/2019 | Min | F21S 41/285 |
| 2023/0138596 A1 | * | 5/2023 | Qiu | G02B 3/0068 362/509 |

* cited by examiner

*Primary Examiner* — James R Greece
*Assistant Examiner* — Michael Chiang
(74) *Attorney, Agent, or Firm* — DLA PIPER LLP (US)

(57) ABSTRACT

A lens sheet and a lamp for a vehicle. The lamp includes a light source part and a lens sheet that outputs the light input from the light source part and that forms different lighting images according to viewing angles, the lens sheet includes a printed pattern layer, on which a specific pattern image is printed, and a lenticular lens that form the different lighting images according to the viewing angles by diffusing the light that passed through the pattern image, the lenticular lens includes a plurality of diffusion lenses, and at least some of the plurality of diffusion lenses have different curvatures.

6 Claims, 9 Drawing Sheets

LENS SHEET WITH DIFFERENT VIEWING ANGLES AND LAMP FOR VEHICLE

CROSS-REFERENCE TO RELATED APPLICATION

This application claims the benefit of priority to Korean Patent Application No. 10-2022-0156634, filed in the Korean Intellectual Property Office on Nov. 21, 2022, the entire contents of which are incorporated herein by reference.

TECHNICAL FIELD

The present disclosure relates to a lens sheet and a lamp for a vehicle.

BACKGROUND

In general, a vehicle is provided with various kinds of lamps having a lighting function for easily identifying an object located around the vehicle during nighttime driving and a signal function for informing another vehicle or a user of a driving state of the vehicle. For example, a turn signal lamp, a tail lamp, a brake lamp, a side marker, or the like are a signal lamp that is mainly targeted for a signal function.

Various technologies are applied to differentiate images of a signal lamp to differentiate designs and secure an aesthetic performance of the lamp for a vehicle. According to a conventional technology, a method of using a hologram technology, an optical fiber, or a bezel is used to implement a three-dimensional lighting image of a lamp for a vehicle.

However, the conventional technology requires a separate medium, such as a separate light source or a lens film, and the medium is often formed of a high-priced material and thus costs increase. Accordingly, a technology for enhancing a product value by implementing a three-dimensional effect of a lighting image and increasing a degree of freedom of design of the lighting image while reducing costs is necessary.

SUMMARY

The present disclosure has been made to solve the above-mentioned problems occurring in the prior art while advantages achieved by the prior art are maintained intact.

An aspect of the present disclosure provides a lens sheet that implements various images by implementing a three-dimensional effect and a motion effect in a lighting image and giving perspective and a spatial effect to the lighting image with neither additional costs nor an additional process, and a lamp for a vehicle.

Another aspect of the present disclosure provides a lens sheet that may enhance a product value of a product by differentiating designs and may reduce costs.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a light source part, and a lens sheet that outputs light input from the light source part and that forms different lighting images according to viewing angles, the lens sheet includes a printed pattern layer, on which a specific pattern image is printed, and a lenticular lens that form the different lighting images according to the viewing angles by diffusing the light that passed through the pattern image, the lenticular lens includes a plurality of diffusion lenses, and at least some of the plurality of diffusion lenses have different curvatures.

The lenticular lens may be configured such that the lighting images have perspective due to differences between the curvatures of the plurality of diffusion lenses.

The lenticular lens may be formed such that sizes of the lighting images are different due to the lights that passed through the pattern image and passed through the plurality of diffusion lenses, due to the differences between the curvatures of the plurality of diffusion lenses.

The lens sheet may include an input surface that is a surface, to which a light is input, and an output surface that is an opposite surface to the input surface and is a surface, from which the light is output, and the plurality of diffusion lenses may be disposed in parallel in a direction that faces a peripheral portion of the output surface from a central portion of the output surface when viewed toward the output surface.

The curvatures of the plurality of diffusion lenses may increase as they go in a direction that faces the peripheral portion from the central portion of the output surface such that perspective is given to the lighting images.

The plurality of diffusion lenses may be formed such that the curvatures thereof increase as they go from the central portion of the output surface to the peripheral portion of the output surface.

The plurality of diffusion lenses may be formed such that the curvatures thereof decrease as they go from the central portion of the output surface to the peripheral portion of the output surface.

A lens sheet according to another aspect of the present disclosure includes lenticular lens that diffuses and outputs an input light and that forms different lighting images according to viewing angles, a base lens formed on a lower side of the lenticular lens, a printed pattern layer formed on a lower side of the base lens and on which a specific image is printed, and a reinforced printed layer formed on a lower surface of the printed pattern layer, and the reinforced printed layer is formed by mixing white paint and a transparent toning agent.

The lenticular lens may include a plurality of diffusion lenses, and at least some of the plurality of diffusion lenses may have different curvatures.

The printed pattern layer may include a resin matrix provided on a lower side of the base lens, and a pattern ink layer formed in the resin matrix.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail according to the accompanying drawings.

First, the embodiments that will be described below are embodiments that are suitable for helping understand the technical features of a lens sheet and a lamp for a vehicle according to the present disclosure. However, the present disclosure is neither limited to the embodiments that will be described below nor the technical features of the present disclosure is restricted by the described embodiments, and various modifications may be made within a technical range of the present disclosure.

Figure 1:
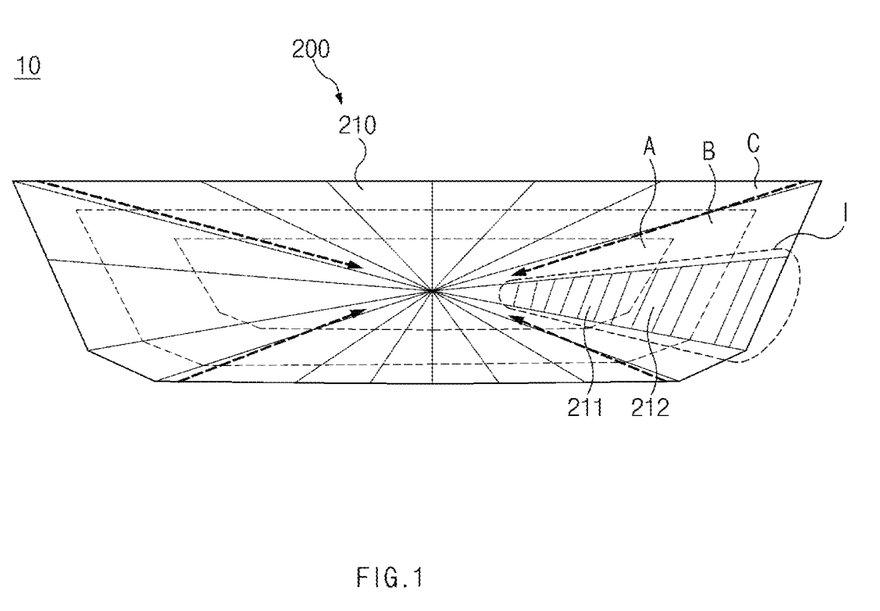
FIG. 1 illustrates a lamp for a vehicle according to an embodiment of the present disclosure, and is a front view illustrating a front surface of a first embodiment of a diffusion lens according to the present disclosure.

FIG. 1 illustrates a lamp for a vehicle according to an embodiment of the present disclosure, and is a front view illustrating a front surface of a first embodiment of a diffusion lens according to the present disclosure.

Figure 2:
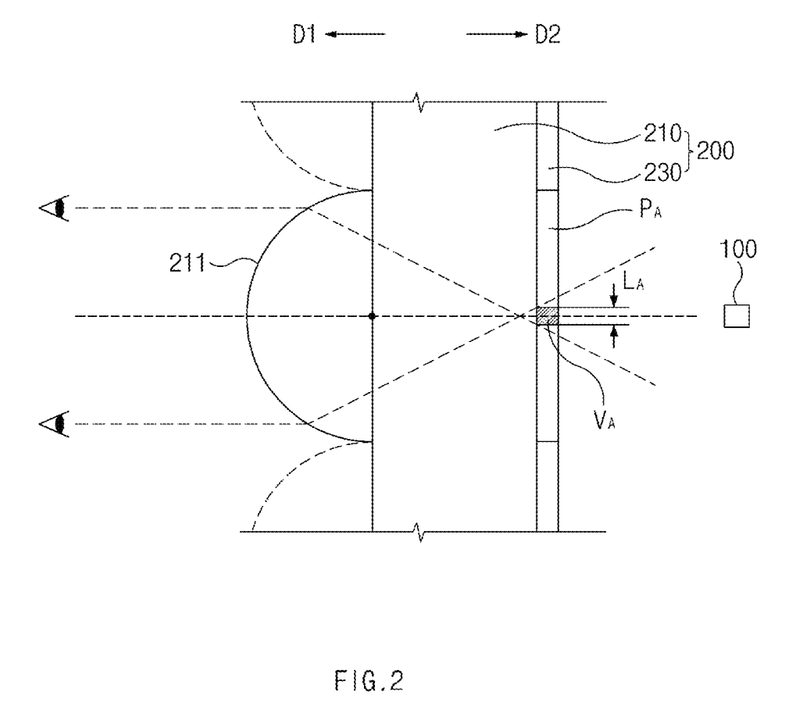
FIG. 2 is a cross-sectional view illustrating a cross-section of area "A" of the first embodiment of the diffusion lens according to the present disclosure.

FIG. 2 is a cross-sectional view illustrating a cross-section of area "A" of the first embodiment of the diffusion lens according to the present disclosure.

Figure 3:
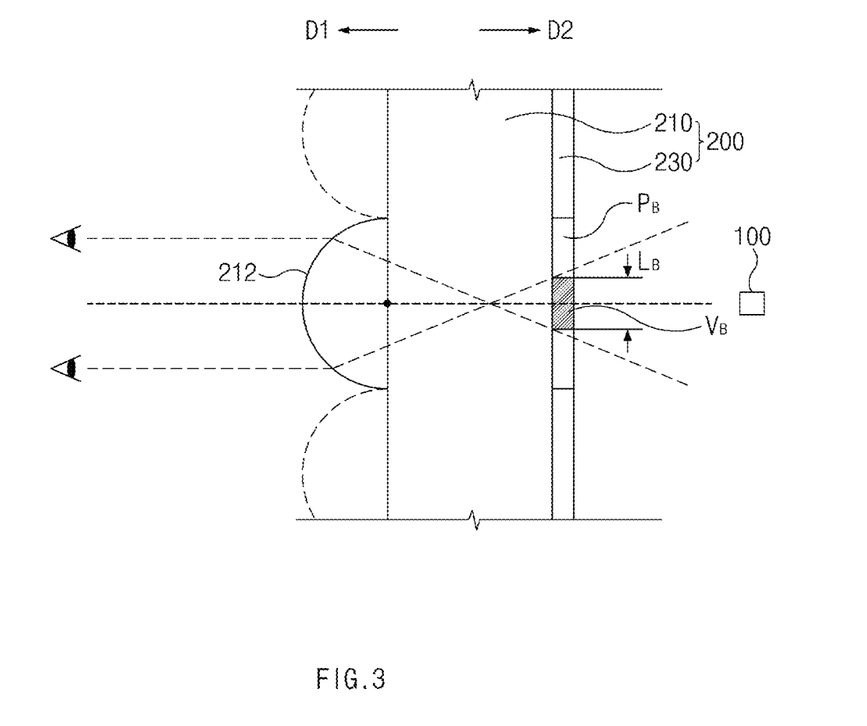
FIG. 3 is a cross-sectional view illustrating a cross-section of area "B" of the first embodiment of the diffusion lens according to the present disclosure.

FIG. 3 is a cross-sectional view illustrating a cross-section of area "B" of the first embodiment of the diffusion lens according to the present disclosure.

Figure 4:
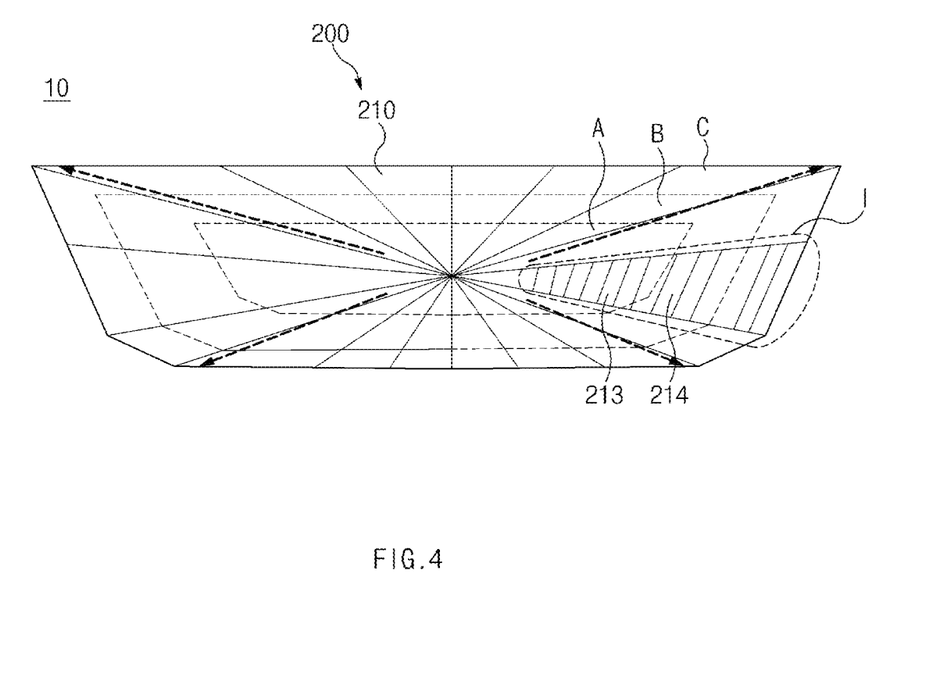
FIG. 4 illustrates a lamp for a vehicle according to an embodiment of the present disclosure, and is a front view illustrating a front surface of a second embodiment of a diffusion lens according to the present disclosure.

FIG. 4 illustrates a lamp for a vehicle according to an embodiment of the present disclosure, and is a front view illustrating a front surface of a second embodiment of a diffusion lens according to the present disclosure.

Figure 5:
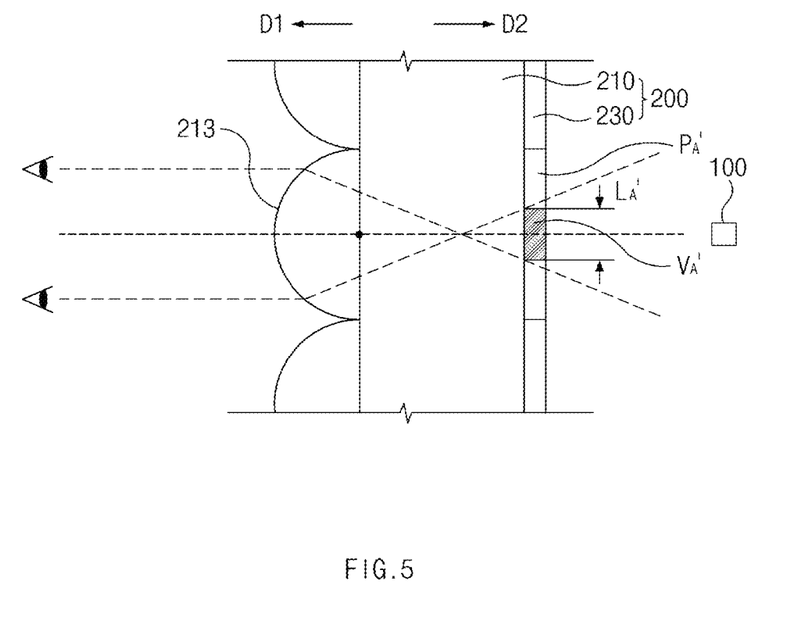
FIG. 5 is a cross-sectional view illustrating a cross-section of area "A" of the second embodiment of the diffusion lens according to the present disclosure.

FIG. 5 is a cross-sectional view illustrating a cross-section of area "A" of the second embodiment of the diffusion lens according to the present disclosure.

Figure 6:
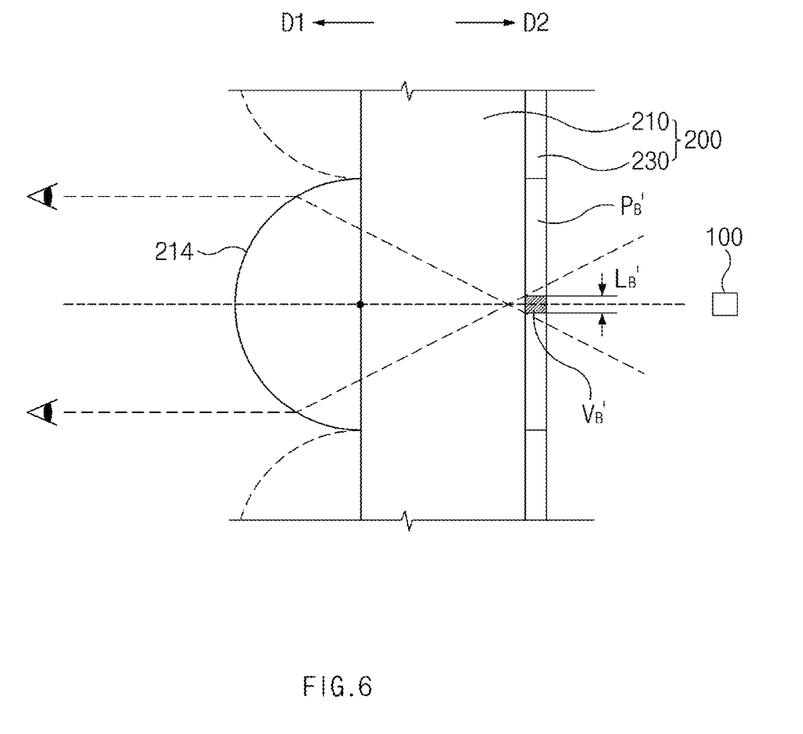
FIG. 6 is a cross-sectional view illustrating a cross-section of area "B" of the second embodiment of the diffusion lens according to the present disclosure.

FIG. 6 is a cross-sectional view illustrating a cross-section of area "B" of the second embodiment of the diffusion lens according to the present disclosure.

Figure 7:
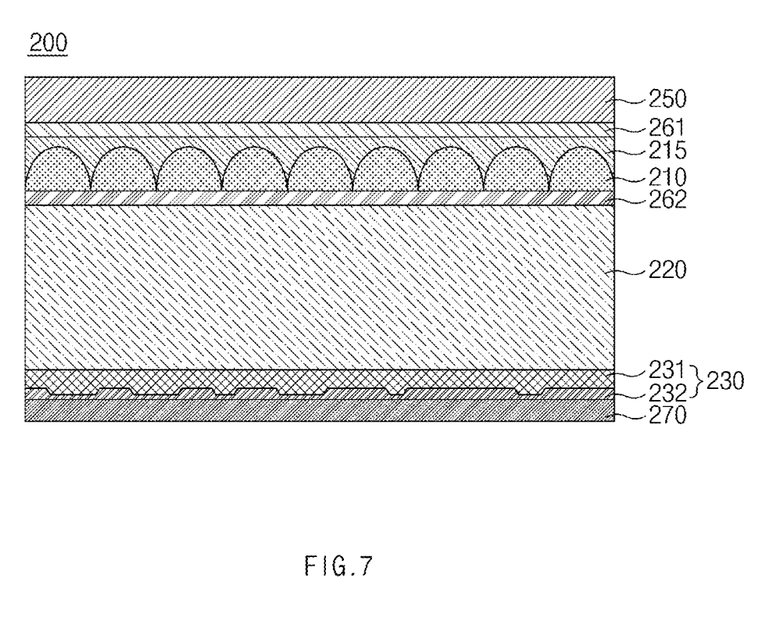
FIG. 7 is a cross-sectional view illustrating a cross-section of a lens sheet according to the present disclosure.

FIG. 7 is a cross-sectional view illustrating a cross-section of a lens sheet according to the present disclosure.

Figure 8:
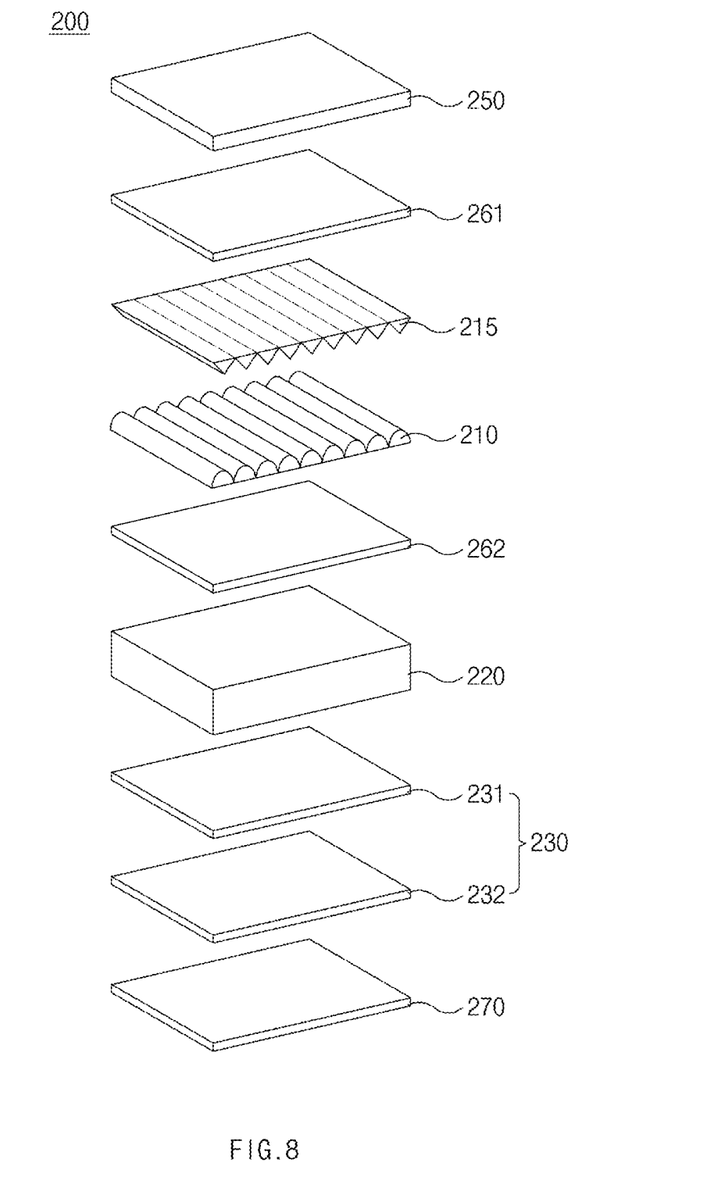
FIG. 8 is an exploded perspective view of the lens sheet according to the present disclosure.

FIG. 8 is an exploded perspective view of the lens sheet according to the present disclosure.

Figure 9:
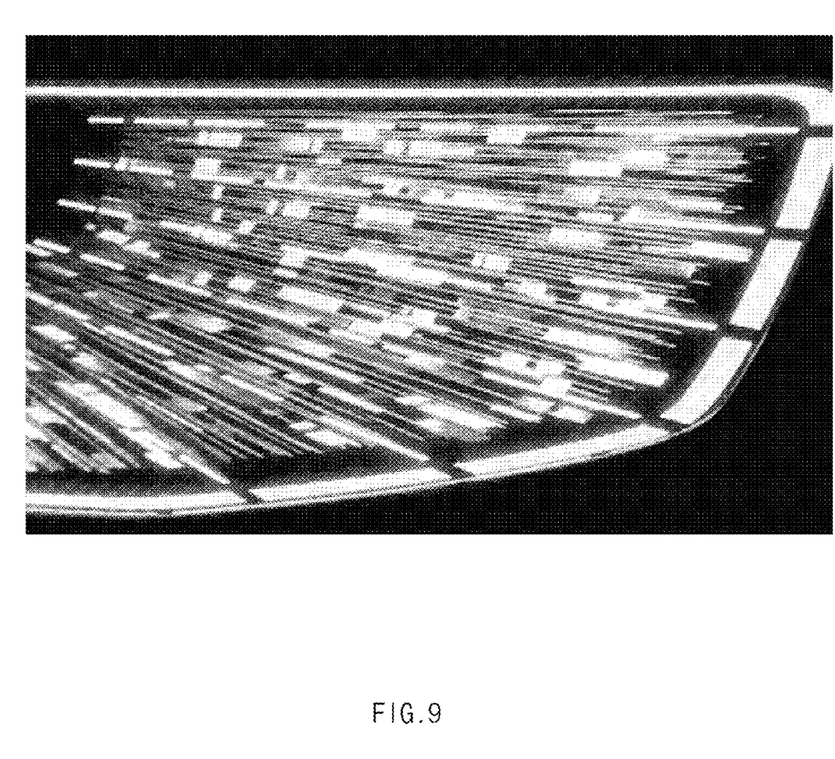
FIG. 9 illustrates a light image of a lamp for a vehicle according to an embodiment of the present disclosure, and illustrates an example of the first embodiment of the diffusion lens according to the present disclosure.

FIG. 9 illustrates a light image of a lamp for a vehicle according to an embodiment of the present disclosure, and illustrates an example of the first embodiment of the diffusion lens according to the present disclosure.

A lamp 10 for a vehicle according to the present disclosure, for example, may be a rear lamp. However, a kind of the lamp, to which the present disclosure is applied, is not limited thereto, and the lamp 10 for a vehicle, such as a headlamp, includes a light source part 100 and a lens sheet 200.

The light source part 100 may be various elements or devices that are configured to irradiate light and emit light. The light source part 100 may include a plurality of light sources that irradiate light. For example, the light source may be a light emitting diode (LED), but the present disclosure is not limited thereto. Furthermore, as an example, the light source part 100 may further include a board (not illustrated), on which a plurality of light sources are installed.

The lens sheet 200 is configured to output the light input from the light source part 100 and such that different lighting images are formed according to viewing angles.

In detail, when the light source part 100 is turned on, an observer may recognize that the lighting image of the lamp 10 for a vehicle is moved according to an angle, by which the lamp 10 for a vehicle is viewed, by using the lens sheet 200. Accordingly, the embodiment of the present disclosure may implement different lighting images according to the viewing angles.

In detail, the lens sheet 200 includes a printed pattern layer 230 and a lenticular lens 210.

A specific pattern image is printed on the printed pattern layer 230. Furthermore, the lenticular lens 210 may form different lighting images according to viewing angles by diffusing the light that passed through the pattern image.

Furthermore, the lenticular lens 210 includes a plurality of diffusion lenses 211. Furthermore, at least some of the plurality of diffusion lenses 211 are formed to have different curvatures.

Hereinafter, a direction, in which the light that passed through the lens sheet 200 is output, that is, a direction that faces the lens sheet 200 from the light source part 100 will be referred to as an output direction D1 for convenience of description, and an opposite direction to the output direction D1, that is, a direction that faces the light source part 100 from the lens sheet 200 will be referred to as a light source direction D2. For example, the lamp 10 for a vehicle according to the present disclosure is a rear lamp, the output direction D1 may be, among forward and rearward directions of the vehicle, a rearward direction.

In detail, the lenticular lens 210 means a principle of helping an observer to recognize a two-dimensional image in a three dimension by using a binocular disparity. Here, the binocular disparity means a difference of sights of a left eye and a right eye.

The diffusion lens 211 may be formed on the output surface of the lenticular lens 210 to have a shape that is convex in the output direction. The printed pattern layer 230 may be formed on the input surface of the lenticular lens 210, and a specific pattern image may be formed. As an example, the diffusion lens 211 may have a hemispherical or arc shape, but the present disclosure is not limited thereto, and a curved surface which has a specific curvature and may diffuse light in leftward and rightward directions may be applied with no limitation.

A plurality of diffusion lenses 211 may be arranged along one direction. Alternatively, the plurality of diffusion lenses 211 may be classified into a plurality of groups, and the diffusion lenses 211 pertaining to one group may be arranged in the same direction and arrangement directions of the diffusion lenses 211 of different groups may be different. As an example, as in the illustrated embodiment, the lenticular lens 210 may include a plurality of diffusion lenses 211 that are arranged toward a peripheral portion from a central portion thereof.

The light generated by the light source part 100 may pass through the pattern image of the printed pattern layer 230, and may be refracted by the diffusion lens 211 to be recognized as a three-dimensional image by an observer due to the binocular disparity principle. Accordingly, according to the present disclosure, a motion effect and a three-dimensional effect may be given to the lighting images.

For reference, in the specification, the pattern image may mean a two-dimensional printed pattern that is printed on the printed pattern layer 230. Furthermore, the lighting images may be lamp images that are recognized by an observer when the light source part 100 is turned on, and as described above, the lighting images according to the present disclosure may be three-dimensional images.

Here, at least some of the plurality of diffusion lenses 211 are formed to have different curvatures.

For example, all of curvatures of the plurality of diffusion lenses 211 may be different, and the plurality of diffusion lenses 211 may be classified into groups and curvatures in the classified groups may be different.

In this way, according to an embodiment of the present disclosure, a three-dimensional effect and a motion effect may be implemented in the lighting images by providing the lenticular lens 210 to the lens sheet 200, and various images having perspective and a spatial effect may be implemented by making curvatures of at least some of the plurality of diffusion lenses 211 different.

Accordingly, the present disclosure may enhance a product value of a product by differentiating designs. Furthermore, because different design elements may be added due to the differences between the curvatures without adding a separate device or configuration, costs may be reduced.

Referring to FIGS. 1 to 9, in an embodiment of the present disclosure, the lenticular lens 210 may be configured such that the lighting images have perspective due to the differences between the curvatures of the plurality of diffusion lenses 211.

Furthermore, the lenticular lens 210 may be configured such that sizes of the lighting images are made different due to the lights that passed through the pattern image and passed through the plurality of diffusion lenses 211, due to the differences between the curvatures of the plurality of diffusion lenses 211.

In detail, when the curvatures of the diffusion lenses 211 are different, diffusion degrees of the lights that passed through the diffusion lenses 211 may become different. Accordingly, even when the pattern image is formed by repeatedly forming the images of the same sizes in the printed pattern layer 230, an observer may recognize the lighting images implemented by the images of different sizes. Accordingly, various designs, such as perspective, may be implemented in the lighting images.

In more detail, the lens sheet 200 may include an input surface that is a surface, to which the light is input, and an output surface that is an opposite surface to the input surface and is a surface, from which the light is output.

Furthermore, when viewed toward the output surface, the plurality of diffusion lenses 211 may be disposed in parallel in a direction that faces the peripheral portion of the output surface from the central portion of the output surface.

Curvatures of the plurality of diffusion lenses 211 may be formed to increase or decrease as they go from the central portion of the output surface toward the peripheral portion of the output surface whereby perspective is given to the lighting images.

In detail, the diffusion lenses 211 may be disposed such that perspective is felt when the lenticular lens 210 is viewed in the light source direction D2. For example, as in area "I" of FIGS. 1 and 4, lengths of the diffusion lenses 211 may be formed to become larger as they go from the central portion to the peripheral portion of the lenticular lens 210.

Furthermore, the curvatures of the diffusion lenses 211 may increase or decrease as they go from the central portion to the peripheral portion of the lenticular lens 210. Hereinafter, for convenience of description, a motion distance that will be described below means a lighting image recognized by an observer, and a distance, by which a pattern image is moved due to a binocular disparity of the observer.

Because a larger amount of light is diffused as the curvatures of the diffusion lenses 211 become larger, the motion distance of the pattern image may become larger, and thus, the corresponding lighting image may appear larger. In contrast, because a smaller amount of light is diffused as the curvatures of the diffusion lenses 211 become smaller, the motion distance of the pattern image becomes smaller, and thus, the corresponding lighting image may appear smaller.

In this way, the sizes of the lighting images may be made different by making the motion distance different by using the difference between the curvatures of the diffusion lenses 211 whereby perspective may be implemented.

For example, the curvatures of the diffusion lenses 211 may gradually increase or decrease as they go from the central portion to the peripheral portion. Alternatively, the diffusion lenses 211 may be classified into a plurality of groups according to the differences between locations from the central portion to the peripheral portion, and the curvatures for the groups may be changed according to the locations.

FIGS. 1 to 3 illustrate the first embodiment of the diffusion lenses according to the present disclosure, and FIGS. 4 to 6 illustrate the second embodiment of the diffusion lenses according to the present disclosure. The first embodiment of the diffusion lenses and the second embodiment of the diffusion lenses are different in curvature patterns of the diffusion lenses according to the distances from the central portion. However, the embodiments implemented by the present disclosure are not limited to FIGS. 1 to 6, and various embodiments may be applied as long as a spatial depth may be expressed by giving the three-dimensional effect and perspective to the lighting images at the same time by using the lenticular lens 210 and differences between the curvatures of the diffusion lenses.

The first embodiment of the diffusion lenses according to the present disclosure, which is illustrated in FIGS. 1 to 3 implements the lighting images, in which the central portion of the lenticular lens 210 appear farther. In this case, perspective may be implemented in the lighting images by a vanishing point formed in the central portion.

Furthermore, the second embodiment of the present disclosure, which is illustrated in FIGS. 4 to 6, implements the lighting images, in which the peripheral portion of the lenticular lens 210 appear farther. In this case, perspective may be implemented in the lighting images by a vanishing point formed in the peripheral portion.

FIGS. 1 to 6 illustrates that the diffusion lenses 211 provided in the lenticular lens 210 are grouped into a plurality of groups according to the distances from the central portion. Area "A" illustrated is an area that is closest to the central portion of the lenticular lens 210, area "C" is an area that is farthest from the central portion, and area "B" is an area that is disposed between area "A" and area "C". For example, the diffusion lenses 211 included in one area may have the same curvature.

First, referring to FIGS. 1 to 3, the curvatures of the plurality of diffusion lenses 211 and 212 may be formed to gradually increase as they go from the central portion of the output surface to the peripheral portion of the output surface. Accordingly, the lighting images according to the first embodiment of the diffusion lenses may be implemented as images that become deeper as they go in a direction of an arrow of FIG. 1.

Hereinafter, the first embodiment of the present disclosure will be described in detail with reference to the accompanying drawings. FIG. 2 illustrates a longitudinal cross-section of area "A" of the first embodiment of the diffusion lenses. The light emitted from the light source part 100 may pass through an image pattern PA and be output while being diffused by the diffusion lenses 211.

In the first embodiment of the diffusion lenses, the curvatures of the diffusion lenses 211 provided in area "A" that is the central portion of the lenticular lens 210 may be smaller than the curvatures of the diffusion lenses 211 provided in the other areas. That is, the diffusion lenses 211 of area "A" in the first embodiment of the diffusion lenses may have larger radii of curvature. Accordingly, in FIG. 2, a motion distance LA recognized by an observer may be small, and the lighting images VA may be relatively small.

FIG. 3 is a cross-sectional view illustrating a cross-section of area "B" of the first embodiment of the diffusion lens according to the present disclosure. The light emitted from the light source part 100 may pass through an image pattern PB and be output while being diffused by the diffusion lenses 212.

In the first embodiment of the diffusion lenses, the curvatures of the diffusion lenses 212 provided in area "B" of the lenticular lens 210 may be larger than the curvatures of the diffusion lenses 211 provided in area "A". In other words, the diffusion lenses 212 of area "B" according to the first embodiment of the diffusion lenses may be small. Accordingly, in FIG. 2, a motion distance LB recognized by an observer may be small, and the lighting images VB may be larger than that of area "A".

Accordingly, the lighting images implemented by the first embodiment of the diffusion lenses according to the present disclosure may implement an effect as if the images were moved toward the central portion.

Referring to FIGS. 4 to 6, the curvatures of a plurality of diffusion lenses 213 and 214 may be formed to gradually decrease as they go from the central portion of the output surface to the peripheral portion of the output surface. Accordingly, the lighting images according to the second embodiment of the diffusion lenses of the present disclosure may be implemented by images that become deeper as they go toward the peripheral portion, that is, in a direction of an arrow of FIG. 4.

Hereinafter, the second embodiment of the diffusion lens of the present disclosure will be described in detail with reference to the drawings. FIG. 5 illustrates a longitudinal cross-section of area "A" of the second embodiment of the diffusion lenses. The light emitted from the light source part 100 may pass through an image pattern PA' and be output while being diffused by the diffusion lenses 213.

In the second embodiment of the diffusion lenses, the curvatures of the diffusion lenses 213 provided in area "A" that is the central portion of the lenticular lens 210 may be larger than the curvatures of the diffusion lenses 213 provided in the other areas. That is, the diffusion lenses 213 of area "A" in the second embodiment of the diffusion lenses may have smaller radii of curvature. Accordingly, in FIG. 5, a motion distance LA' recognized by an observer may be large, and the lighting images VA' may be relatively large.

FIG. 6 illustrates a longitudinal cross-section of area "B" of the second embodiment of the diffusion lenses. The light emitted from the light source part 100 may pass through an image pattern PB' and be output while being diffused by the diffusion lenses 214.

In the second embodiment of the diffusion lenses, the curvatures of the diffusion lenses 214 provided in area "B" of the lenticular lens 210 may be smaller than the curvatures of the diffusion lenses 213 provided in area "A". That is, the diffusion lenses 214 of area "B" in the second embodiment may have larger radii of curvature. Accordingly, in FIG. 2, a motion distance LB recognized by an observer may be small, and the lighting images VB may be smaller than that of area "A".

Accordingly, the lighting images implemented by the second embodiment according to the present disclosure may implement an effect as if the images were moved toward the central portion.

As described above, the lighting images may be designed to have one or more vanishing points, and may be designed such that the sizes of the lighting images become smaller as they become closer to the vanishing point. This may be implemented by the differences between the curvatures for the locations of the diffusion lenses 211, 212, 213, and 214.

Meanwhile, hereinafter, referring to FIGS. 7 and 8, the lens sheet 200 according to an embodiment of the present disclosure will be described. The lens sheet 200 that will be described below may be the lens sheet 200 that is applied to the above-described lamp 10 for a vehicle.

The lens sheet 200 according to an embodiment of the present disclosure may include the lenticular lens 210, a base lens 220, the printed pattern layer 230, and a reinforced printed layer 270. Furthermore, the lens sheet 200 according to an embodiment of the present disclosure may further include a first primer 261, a second primer 262, and a protective film layer 250.

The lenticular lens 210 is configured to diffuse and output the input light, and to form different lighting images according to viewing angles.

Here, the lenticular lens 210 may include the plurality of diffusion lenses 211. Furthermore, at least some of the plurality of diffusion lenses 211 may be formed to have different curvatures.

For example, curvatures of the plurality of diffusion lenses 211 may be formed to increase or decrease as they go from the central portion of the output surface toward the peripheral portion of the output surface whereby perspective is given to the lighting images. Accordingly, according to an embodiment of the present disclosure, a three-dimensional effect and a motion effect may be implemented in the lighting images by providing the lenticular lens 210 to the lens sheet 200, and various images having perspective and a spatial effect may be implemented by making curvatures of at least some of the plurality of diffusion lenses 211 different.

The base lens 220 is formed on a lower side of the lenticular lens 210. The base lens 220 may function to form a focal distance of the lens sheet 200. The base lens 220 may be polycarbonate (PC) or the like, but the present disclosure is not limited thereto.

The printed pattern layer 230 is formed on a lower side of the base lens 220, and a pattern image is printed thereon. A pattern image for expressing a three-dimensional effect may be printed on the printed pattern layer 230. The pattern image included in the printed pattern layer 230 may be implemented by the lighting images having a three-dimensional effect, a conversion effect, and perspective by using the lenticular lens 210.

The printed pattern layer 230 may include a resin matrix 231 provided on a lower side of the base lens 220, and a pattern ink layer 232 formed in the resin matrix 231.

In detail, the resin matrix 231 may include a light transmitting resin or the like, and a two-dimensional image for implementing the lighting images may be formed. For example, in the resin matrix 231, the pattern image may be patterned in a form of nano meshes. In this way, a transmittance of the lens sheet 200 may be improved by improving a mesh process to form the resin matrix 231.

The pattern ink layer 232 may be formed on a lower side of the resin matrix 231, and may include a black ink layer to make the pattern image clear.

The reinforced printed layer 270 is formed on a lower surface of the printed pattern layer 230. The reinforced printed layer 270 may be formed on the lower surface of the pattern ink layer 232 to protect the printed pattern layer 230.

Here, the reinforced printed layer 270 may be formed by mixing white paint and a transparent toning agent. In general, the reinforced printed layer 270 may include white paint. The present disclosure may further improve a transmittance of the lens sheet 200 by mixing the white paint with the transparent toning agent.

In this way, the embodiment of the present disclosure may improve a mesh process for forming the resin matrix 231, and may further improve a transmittance of the optical lens sheet 200 by adding a transparent color mixing process to the reinforced printed layer 270.

Meanwhile, the lens sheet 200 may further include the first primer 261, the second primer 262, and the protective film layer 250.

The first primer 261 may be formed between the lenticular lens 210 and the protective film layer 250. The second primer 262 may be formed between the lenticular lens 210 and the base lens 220. The first primer 261 and the second primer 262 may function to enhance a durability and a reliability of the lens sheet 200.

The protective film layer 250 may be formed on an upper side of the lens sheet 200 to function to protect the lenticular lens 210. Reference numeral 215 that has not been described denotes a refraction resin.

According to the above embodiment of the present disclosure, various images may be implemented by implementing a three-dimensional effect and a motion effect in the lighting images and giving perspective and a spatial effect to the lighting images with neither additional costs nor an additional process as well. Accordingly, according to an embodiment of the present disclosure, a product value of a product may be enhanced by differentiating designs, and costs may be reduced.

Various images may be implemented by implementing a three-dimensional effect and a motion effect in a lighting image and giving perspective and a spatial effect to the lighting image with neither additional costs nor an additional process, Accordingly, according to an embodiment of the present disclosure, a product value of a product may be enhanced by differentiating designs, and costs may be reduced.

Although the present disclosure has been described above with reference to the limited embodiments and drawings, the present disclosure is not limited thereto, and it is apparent that various embodiments may be made within the technical spirits of the present disclosure and an equivalent range of the claims, which will be described below.

What is claimed is:

1. A lamp for a vehicle, said lamp comprising:
a light source part; and
a lens sheet configured to output light input from the light source part and configured to form different lighting images according to respective viewing angles, the lens sheet comprising:
   a printed pattern layer on which a specific pattern image is printed; and
   a lenticular lens configured to form the different lighting images according to the viewing angles by diffusing the light that passed through the pattern image,
wherein the lenticular lens comprises a plurality of diffusion lenses, and at least some of the plurality of diffusion lenses have different curvatures;
wherein each of the plurality of diffusion lenses have different lengths; and
wherein the lens sheet includes an input surface, to which the light is input, and an output surface, that is opposite the input surface, from which the light is output, and along each of a plurality of radial directions that face a peripheral portion of the output surface from a central portion of the output surface when viewed toward the output surface, the plurality of diffusion lenses are disposed in parallel.

2. The lamp of claim 1, wherein the lenticular lens is configured such that the lighting images have perspective due to differences between the curvatures of the plurality of diffusion lenses.

3. The lamp of claim 1, wherein the lenticular lens is formed such that sizes of the lighting images are different due to the light that passed through the pattern image and passed through the plurality of diffusion lenses due to the differences between the curvatures of the plurality of diffusion lenses.

4. The lamp of claim 1, wherein the curvatures of the plurality of diffusion lenses increase as they go in a direction that faces the peripheral portion from the central portion of the output surface.

5. The lamp of claim 1, wherein the plurality of diffusion lenses are formed such that the curvatures thereof increase as they go along the plurality of radial directions from the central portion of the output surface to the peripheral portion of the output surface.

6. The lamp of claim 1, wherein the plurality of diffusion lenses are formed such that the curvatures thereof decrease as they go along the plurality of radial directions from the central portion of the output surface to the peripheral portion of the output surface.

* * * * *